United States Patent
Liu et al.

(10) Patent No.: US 12,420,282 B2
(45) Date of Patent: Sep. 23, 2025

(54) MICROCHANNEL DEVICE, AND HIGH-OIL-LOAD MICROCAPSULE AND METHOD FOR PREPARING THE SAME USING THE MICROCHANNEL DEVICE

(71) Applicant: Nanchang University, Nanchang (CN)

(72) Inventors: Yikun Liu, Nanchang (CN); Xing Chen, Nanchang (CN); Wei Liu, Nanchang (CN); Yuan Wang, Nanchang (CN); Liqiang Zou, Nanchang (CN)

(73) Assignee: Nanchang University, Nanchang (CN)

( * ) Notice: Subject to any disclaimer, the term of this patent is extended or adjusted under 35 U.S.C. 154(b) by 246 days.

(21) Appl. No.: 18/349,400

(22) Filed: Jul. 10, 2023

(65) Prior Publication Data

US 2023/0347348 A1  Nov. 2, 2023

(30) Foreign Application Priority Data

Jul. 18, 2022  (CN) .......................... 202210839003.9

(51) Int. Cl.
| | |
|---|---|
| *B01L 3/00* | (2006.01) |
| *B01J 13/02* | (2006.01) |
| *B01J 13/20* | (2006.01) |

(52) U.S. Cl.
CPC ....... *B01L 3/502769* (2013.01); *B01J 13/025* (2013.01); *B01J 13/203* (2013.01); *B01L 2300/0681* (2013.01); *B01L 2300/0867* (2013.01); *B01L 2300/1894* (2013.01); *B01L 2400/0409* (2013.01)

(58) Field of Classification Search
CPC ....... B01L 3/502769; B01L 2300/0681; B01L 2300/0867; B01L 2300/1894; B01L 2400/0409; B01J 13/025; B01J 13/203
See application file for complete search history.

(56) References Cited

U.S. PATENT DOCUMENTS

| | | | | |
|---|---|---|---|---|
| 5,021,248 | A | * 6/1991 | Stark | ...... A23D 7/015 |
| | | | | 426/531 |
| 5,776,490 | A | * 7/1998 | Chu | ...... A23K 40/30 |
| | | | | 424/452 |

(Continued)

FOREIGN PATENT DOCUMENTS

| | | |
|---|---|---|
| CN | 112971143 A | 6/2021 |
| WO | WO-2012075575 A1 * 6/2012 | ........... A23L 33/185 |

*Primary Examiner* — Galen H Hauth
*Assistant Examiner* — John Robitaille (57) ABSTRACT

A microchannel device, including a homogenization chamber, a deceleration-cooling channel, an acidity regulation channel, a microchannel reaction chamber, and an ultrafiltration desalination chamber. A method for preparing high-oil-load microcapsules using the aforementioned microchannel device, including: preparing an aqueous phase and an oil phase; feeding the aqueous phase and the oil phase to the homogenization chamber to form a first emulsion; cooling the first emulsion; adjusting pH of the first emulsion with dilute hydrochloric acid; feeding the first emulsion to the microchannel reaction chamber to form a second emulsion with a core-shell structure; removing $Na^+$ and $Cl^-$ from the second emulsion; and subjecting the second emulsion to spray drying to obtain the high-oil-load microcapsule powder.

4 Claims, 8 Drawing Sheets

(56) References Cited

U.S. PATENT DOCUMENTS

| | | | |
|---|---|---|---|
| 11,191,723 B2* | 12/2021 | Panagiotou | B01F 35/7176 |
| 2015/0202304 A1* | 7/2015 | Kaplan | A61K 8/11 |
| | | | 264/4.1 |
| 2019/0060486 A1* | 2/2019 | Lisboa | A61K 9/141 |

* cited by examiner

MICROCHANNEL DEVICE, AND HIGH-OIL-LOAD MICROCAPSULE AND METHOD FOR PREPARING THE SAME USING THE MICROCHANNEL DEVICE

CROSS-REFERENCE TO RELATED APPLICATIONS

This application claims the benefit of priority from Chinese Patent Application No. 202210839003.9, filed on Jul. 18, 2022. The content of the aforementioned application, including any intervening amendments thereto, is incorporated herein by reference in its entirety.

TECHNICAL FIELD

This application relates to microcapsule preparation, and more particularly to a microchannel device, and a high-oil-load microcapsule and a method for preparing the same using the microchannel device.

BACKGROUND

Microencapsulation has been widely used in food, pharmaceuticals, cosmetics, and biomaterials, which has many beneficial effects on the core material, such as avoiding degradation of sensitive ingredients, masking undesirable flavors, controlling the release, reducing the volatility, and improving the material compatibility. Oil load is one of the key indicators for evaluating the microcapsule application. A relatively high oil load can reduce the consumption of wall material to lower the costs, and is thus recommended. The structural composition of the wall material is closely associated with the performance and application of the microcapsule. Therefore, it is required to fully consider physical and chemical properties of the wall material, such as solubility, stability, film-forming property, and emulsibility, and on that basis, a cheap and readily-available wall material is preferred. At present, proteins have been widely used as wall material in microencapsulation, where the commonly-used protein wall materials are water-soluble proteins, such as whey protein and casein protein. However, these water-soluble proteins have poor film-forming properties, and low extensibility, which makes it difficult to load a higher oil content, resulting in low encapsulation rate and poor performance. Hence, how to select a suitable wall material to improve the oil loading capacity of microcapsules has been a problem urgently to be solved in the food industry.

Alcohol-soluble proteins (prolamins), such as gliadin, zein, and kafirin, have good film-forming properties, high mechanical properties, and good viscosity, such that they are considered as potential wall materials for functional delivery systems such as emulsions and microcapsules. Moreover, the strong film-forming property allows for high oil load without internal leakage. By changing the solvent polarity, the alcohol-soluble proteins will self-assemble into micro/nanoparticles, such that they are suitable for various delivery systems, such as delivery systems for Pickering emulsions, high internal phase emulsions (HIPE), composite nanoparticles, and nanoparticle drugs. Unfortunately, the alcohol-soluble proteins can only be dissolved in ethanol in most cases due to their low water solubility, greatly limiting their application. Chinese Patent Application Publication No. 112971143A discloses a method for making microcapsules by embedding docosahexaenoic acid (DHA) in a modified zein, in which algae oil DHA-loading microcapsules with an oil load of 38%-50% are obtained through the organic solvent precipitation. However, this method has poor emulsion production efficiency and low oil load, and requires the consumption of organic reagents. Therefore, how to use alcohol-soluble proteins as wall materials in the absence of organic solvents is an urgent problem in the food industry.

SUMMARY

An object of the present disclosure is to provide a microchannel device, and a high-oil-load microcapsule and a method for preparing the same using the microchannel device to overcome the technical problems in the prior art, such as poor emulsion production efficiency, low oil load, and the demand of organic reagents. This application provides a simple, efficient and green microchannel-based method for preparing high-oil-load microcapsules through pH adjustment.

The microchannel device provided herein comprises a dual-channel high-pressure homogenization chamber, a deceleration cooling channel, an acidity regulation channel, a microchannel reaction chamber, an ultrafiltration desalination chamber, and a spray dryer. The microchannel device allows for the efficient, stable and sustainable preparation of microcapsules without using organic reagents during the process, and the prepared microcapsules have high oil loads and encapsulation rates.

The technical solutions of the present disclosure are described below.

In a first aspect, this application provides a microchannel device, comprising:
  a homogenization chamber; and
  a microchannel reaction chamber;
  wherein the homogenization chamber comprises an aqueous phase feed pipe, an oil phase feed pipe, a first high-pressure acceleration pipe, a second high-pressure acceleration pipe, and a mixing pipe; an inlet end of the first high-pressure acceleration pipe is connected to the aqueous phase feed pipe, and an outlet end of the first high-pressure acceleration pipe is connected to the mixing pipe; an inlet end of the second high-pressure acceleration pipe is connected to the oil phase feed pipe, and an outlet end of the second high-pressure acceleration pipe is connected to the mixing pipe; an inner diameter of the first high-pressure acceleration pipe is smaller than that of the aqueous phase feed pipe, and an inner diameter of the second high-pressure acceleration pipe is smaller than that of the oil phase feed pipe; and
  the microchannel reaction chamber comprises at least one reaction flow channel; the at least one reaction flow channel each comprises at least two microchannels communicated in sequence; each of the at least two microchannels comprises an inner tube and an outer tube; and a space between the inner tube and the outer tube is configured for fluid flowing.

In some embodiments, the microchannel reaction chamber comprises three reaction flow channels, and each reaction flow channel consists of four microchannels connected in sequence, where the inner tube and the outer tube of each microchannel are concentrically hexagonal. In this case, the emulsion can fully react in the reaction chamber, which is conducive to the interfacial coacervation.

In some embodiments, the first high-pressure acceleration pipe is perpendicularly connected to a sidewall of an outlet end of the aqueous phase feed pipe such that a T-shaped structure is formed by the first high-pressure acceleration pipe and the outlet end of the aqueous phase feed pipe; and the second high-pressure acceleration pipe is perpendicularly connected to a sidewall of an outlet end of the oil phase feed pipe such that a T-shaped structure is formed by the second high-pressure acceleration pipe and the outlet end of the oil phase feed pipe. As the inner diameter decrease from the feed pipe to the high-pressure acceleration pipe, a high pressure is formed. Besides, the first high-pressure acceleration pipe and the second high-pressure acceleration pipe are arranged perpendicularly on the sidewall of the aqueous phase feed pipe and the sidewall of the oil phase feed pipe, respectively, instead of the end of the aqueous phase feed pipe or the oil phase feed pipe. In this case, materials are dispersed better, and under the high pressure, the shearing force of the continuous phase liquid will shear off the dispersed phase thereby forming small droplets to form an emulsion. Then the oil and aqueous phases will form an emulsion with stable sizes after passing through the high-pressure homogenization chamber.

In some embodiments, the aqueous phase feed pipe and the oil phase feed pipe each further comprises an inlet end and a middle section; inlet ends and outlet ends of the aqueous phase feed pipe and the oil phase feed pipe are all arranged along a direction parallel to the mixing pipe; middle sections of the aqueous phase feed pipe and the oil phase feed pipe are both arranged in an outward-inclined manner, such that the aqueous phase feed pipe and the oil phase feed pipe are respectively located at two sides of the mixing pipe, and together form a Y-type structure; and the first high-pressure acceleration pipe and the second high-pressure acceleration pipe are both arranged perpendicular to the mixing pipe. The arrangement of Y-shaped feed pipes and the arrangements of the first high-pressure acceleration pipe and the second high-pressure acceleration pipe perpendicular to the mixing pipe facilitate the material dispersion and mixing to form an emulsion.

In some embodiments, the microchannel device further comprises a deceleration cooling channel and a cooling water circulating device, wherein the deceleration cooling channel is arranged between the high-pressure homogenization chamber and the microchannel reaction chamber; the deceleration cooling channel is spiral-shaped; an inlet end of the deceleration cooling channel is connected to the mixing pipe; and an outlet end of the deceleration cooling channel is connected to the at least one reaction flow channel; and the cooling water circulating device is provided with a water inlet and a water outlet; and the deceleration cooling channel is arranged in the cooling water circulating device. The emulsion passes through the deceleration cooling channel 2 such that the temperature and flow rate of the emulsion are reduced, and the heat is taken away by the circulating water outside the pipe.

In some embodiments, the microchannel device further comprises an acidity regulation channel, wherein the acidity regulation channel is arranged between the cooling water circulating device and the microchannel reaction chamber; an inlet end of the acidity regulation channel is connected to the cooling water circulating device, and an outlet end of the acidity regulation channel is communicated with the microchannel reaction chamber; and a pH detection probe is provided in the acidity regulation channel. By arranging the acidity regulation channel, dilute hydrochloric acid can be fed in control. The pH detection probe is configured to detect and feedback the pH of emulsion, and the emulsion is specifically adjusted from pH>10.5 to pH 6.5-7.5. At this point, the proteins, due to self-assembly, undergo interfacial coagulation at the surface of the emulsion to wrap the oil droplets, thus forming a solid core-shell structure.

In some embodiments, the microchannel device further comprises an ultrafiltration desalination chamber for removing $Na^+$ and $Cl^-$ from a reaction mixture;

wherein the ultrafiltration desalination chamber is connected to an outlet end of the microchannel reaction chamber; and the ultrafiltration desalination chamber comprises a hollow fiber ultrafiltration inner chamber, an inlet, a first outlet for discharge of a filtered reaction mixture, and a second outlet for discharge of a waste liquid, wherein the inlet, the first outlet and the second outlet are connected to the hollow fiber ultrafiltration inner chamber. The emulsion flows through the entire ultrafiltration pipes under pressure drive and filters $Na^+$ and $Cl^-$ outward through the fibers. After removal of $Na^+$ and $Cl^-$, the emulsion flows out from the first outlet, and the waste liquid containing $Na^+$ and $Cl^-$ is discharged from the second outlet.

In some embodiments, the microchannel device further comprises spray dryer, wherein the spray dryer is connected to the ultrafiltration desalination chamber and is configured for drying the reaction material. The spray dryer includes a primary tower and a secondary tower. The deionized emulsion undergoes spray drying to form stable, highly oil-loaded microcapsules.

The microchannel device provided herein allows for the efficient, stable and sustainable preparation of microcapsules without using organic reagents during the process, and the prepared microcapsules have high oil loads and encapsulation rates.

In a second aspect, this application provides a green method for preparing an oil-loading microcapsule. In this method, one or more of alcohol-soluble proteins (i.e., gliadin, zein, and kafirin) are used as a wall material to produce an emulsion, and then the emulsion is subjected to spray drying to prepare the oil-loading microcapsules. Without the use of organic reagents, the proteins are dissolved in a high-pH aqueous solution and are made into emulsions through the microchannel, during which the intermediate channels of the microchannel are continuously fed with dilute hydrochloric acid to adjust the emulsion to pH 6.5-7.5. Then, the proteins start to self-assemble and form a new type of emulsion with a core-shell structure by interfacial polymerization on the surface of the droplets. After that, the new emulsion is subjected to desalination by the ultrafiltration desalination chamber and spray drying to form the oil-loading microcapsules. Due to the film-forming and viscous nature of the alcohol-soluble protein, a solid core-shell structure can be formed, which is ductile and can increase the oil load and improve the encapsulation rate.

The method comprises the following steps:
(S1) mixing an alcohol-soluble protein and a hydrocolloid followed by dispersion, alkalinity regulation, and centrifugal filtration to obtain an aqueous phase mixture; and preparing an oil phase;
(S2) feeding the aqueous phase mixture into the homogenization chamber through the aqueous phase feed pipe, and feeding the oil phase into the homogenization chamber through the oil phase feed pipe; dispersing the aqueous phase mixture through the first high-pressure acceleration pipe, and dispersing the oil phase through the second high-pressure acceleration pipe and mixing the aqueous phase mixture and the oil phase in the mixing pipe to form a first emulsion;
(S3) cooling the first emulsion;
(S4) adjusting the first emulsion to pH 6.5-7.5 with dilute hydrochloric acid; allowing the first emulsion to flow into the microchannel reaction chamber to undergo dispersion and mixing such that the alcohol-soluble protein in the aqueous phase mixture undergoes interfacial coacervation to embed the oil phase, thereby obtaining a second emulsion with a core-shell structure;

(S5) removing $Na^+$ and $Cl^-$ from the second emulsion; and (S6) drying the second emulsion to obtain the oil-loading microcapsule in a powder form.

In the prior art, most of the oil-in-water emulsions are prepared by traditional processes, in which the aqueous phase and the oil phase are prepared separately in advance, and the aqueous phase and the oil phase are mixed followed by stirring, dispersion, homogenization and centrifugation. The preparation process is complicated, and the produced emulsions are not uniformly dispersed and have uneven sizes, resulting in unevenly sized microcapsules and low encapsulation rates. In this application, the aqueous phase and the oil phase are directly fed into the microchannel from two different pipes, and form a uniformly dispersed, micro-sized single emulsion through the pressurized pipe. The emulsion flows rapidly in the microchannel, achieving operations of dispersion, homogeneity, and emulsification, thus shortening time for preparing water-in-oil or oil-in-water emulsions compared with the traditional process. Moreover, the produced emulsion has a high-quality single microdroplets, which provides a technical basis for the preparation of microcapsules with high oil-loads from emulsions.

In some embodiments, in step (S1), the alcohol-soluble protein is selected from the group consisting of gliadin, zein, kafirin, and a combination thereof. The alcohol-soluble protein has a spherical three-dimensional network structure formed by hydrophobic bonds, oxygen bonds and intramolecular disulphide bonds, and is soluble in organic reagents, or strong acidic or alkaline environments and insoluble in water, and has a good ductility. The alcohol-soluble protein is mixed with other raw materials to form a mixture solution in an alkaline environment. Then the emulsion is stabilized by increasing the hydrophobic bonds and other forces to form interfacial coacervation on the surface of the oil droplets in the emulsion, since the alcohol-soluble protein is insoluble in water. This reduces the transfer of the oil phase of the emulsion to the external environment and increases the encapsulation rate and oil load of the microcapsule core.

In some embodiments, in step (S1), the hydrocolloid is selected from the group consisting of gum arabic, carrageenan, guar gum, maltodextrin, alpha-cyclodextrin, beta-cyclodextrin, octenyl succinic anhydride-modified (OSA)-modified starch, and a combination thereof. The hydrocolloid has good emulsification or film formation, or excellent properties such as easy to dry and less moisture absorption In some embodiments, in step (S1), the oil phase is selected from the group consisting of camellia oil, linseed oil, peony seed oil, grape seed oil, and a combination thereof.

In some embodiments, in step (S1), the alkalinity regulation is performed to adjust a mixture of the alcohol-soluble protein and the hydrocolloid to pH 10.5-12.

In some embodiments, in step (S1), the centrifugal filtration is performed at 3000-6000 rpm for 5-20 min.

In some embodiments, in step (S3), the first emulsion is cooled through steps of:

feeding the first emulsion to a deceleration-cooling channel, and feeding cooling water into a cooling water circulating device, wherein the deceleration-cooling channel is configured as spiral-shaped to cool the first emulsion and reduce a flow rate of the first emulsion.

In some embodiments, in step (S4), the dilute hydrochloric acid is continuously fed through an acidity regulation channel, and a pH of the first emulsion is monitored and fed back through a pH detection probe.

In some embodiments, in step (S5), the $Na^+$ and $Cl^-$ are removed from the second emulsion through steps of:

feeding the second emulsion to an ultrafiltration desalination chamber equipped with a hollow fiber ultrafiltration inner chamber such that the second emulsion passes through the hollow fiber ultrafiltration inner chamber to remove the $Na^+$ and $Cl^-$. Since a certain amount of NaCl is produced during the adjustment of the alkaline solution to neutral pH, the $Na^+$ and $Cl^-$ need to be removed through the ultrafiltration desalination chamber. By continuously feeding the emulsion into the ultrafiltration desalination chamber, the emulsion without $Na^+$ and $Cl^-$ is collected at the outlet of the ultrafiltration desalination chamber.

In some embodiments, in step (S6), the drying is performed in a spray dryer.

In some embodiments, an inner diameter of each of the at least two microchannels is 0.4-1 mm; in step (S4), the dilute hydrochloric acid has a concentration of 2 mol/L; and in step (S6), a particle size of the oil-loading microcapsule is 4-40 μm.

In a third aspect, this application provides an oil-loading microcapsule prepared by using the aforementioned method, comprising:

a wall material; and a core material;

wherein the wall material consists of the aqueous phase mixture; the core material is the oil phase; the wall material is 20-25% by weight of the oil-loading microcapsule; and the core material is 75-80% by weight of the oil-loading microcapsule.

The principles of the present disclosure are described below.

The alcohol-soluble protein can be dissolved in a strong alkaline environment (pH≥10.5), so the aqueous solution is adjusted to pH 10.5-12 to dissolve alcohol-soluble protein. Then the reaction mixture is fed into the microchannel device, in which the reaction mixture passes through the valves with smaller aperture by the high-speed high-pressure effect of the microchannel such that the reaction mixture is subjected to collision and shear, thus achieving emulsification and homogenization. Therefore, by using the microchannel, the micro emulsion droplets can be prepared in a short time. Moreover, it can overcome the shortcomings of time-consuming and low efficiency of the traditional methods in the prior art. The microchannel device provided herein is capable of forming a single microdroplet with uniform dispersion and micro size from two immiscible liquids, allowing for dispersion, homogenization and emulsification, while at the same time saving the raw materials, shortening the time required to prepare emulsions compared with the traditional process. Besides, the microchannel device safe and easy to operate. In addition, the dilute hydrochloric acid is added through the acidity regulation channel to adjust the emulsion to pH 6.5-7.5. Based on the oil-water self-assembly behavior of proteins at different pH, a solid core-shell structure is generated at the interface of the emulsion such that the oil droplets are encapsulate, thereby forming microcapsules. The method is simple and green, and can produce microcapsules with high oil loads.

The present disclosure has at least the following beneficial effects.

(1) The microchannel device in this application is conducive to material dispersion, in which the shearing force of the continuous phase liquid will shear off the dispersed phase to form small droplets under high pressure, and the oil and aqueous phases will form an emulsion with stable sizes after passing through the high-pressure homogenization chamber. Through the acidity regulating channel, dilute hydrochloric acid can be added in control, and the pH value is detected by the pH probe. The emulsion can be fully dispersed and react in the microchannel reaction chamber, which facilitates the occurrence of interfacial coalescence, at which time the proteins, due to self-assembly, undergo interfacial coalescence on the surface of the emulsion to wrap the oil droplets, thus forming a firm core-shell structure. Since a certain amount of NaCl is generated when adjusting the emulsion from alkaline to neutral, an ultrafiltration desalination chamber is provided herein for removing $Na^+$ and $Cl^-$ ions. The microchannel device provided in the present disclosure has a simple structure and is easy to use, which is conducive to the dispersion and mixing of emulsions and the formation of a firm core-shell structure.

(2) A microchannel technology is used herein to complete the preparation of an oil-in-water emulsion. Then the oil-in-water emulsion is subjected to spray drying to prepare microcapsule powder with high oil-loads. The alcohol-soluble protein and hydrocolloid are mixed in an alkali solution. Due to the uniform size of the flow channel opening, the liquid passing through the opening can flow uniformly and rapidly in the channel to form a single emulsion. As the alcohol-soluble protein has good film-forming and ductility, and self-assembly properties under different acid and alkali conditions, and the hydrocolloid has excellent properties such as emulsification, film-forming and stability, so the mixture of the alcohol-soluble protein and the hydrocolloid can be used as a wall material for microcapsules. During the spray drying, the wall material adheres well to the outer wall of the microcapsule and thus protects the core material from external contact. Moreover, the well material is particularly capable of encapsulating unsaturated fatty acid oils that are susceptible to oxidation, thereby forming spherical microcapsules. The microcapsules prepared using the method provided in the present disclosure have an average particle size of about 10 μm, a maximum oil load of 80%, and an encapsulation rate of 90%.

Figure 1:
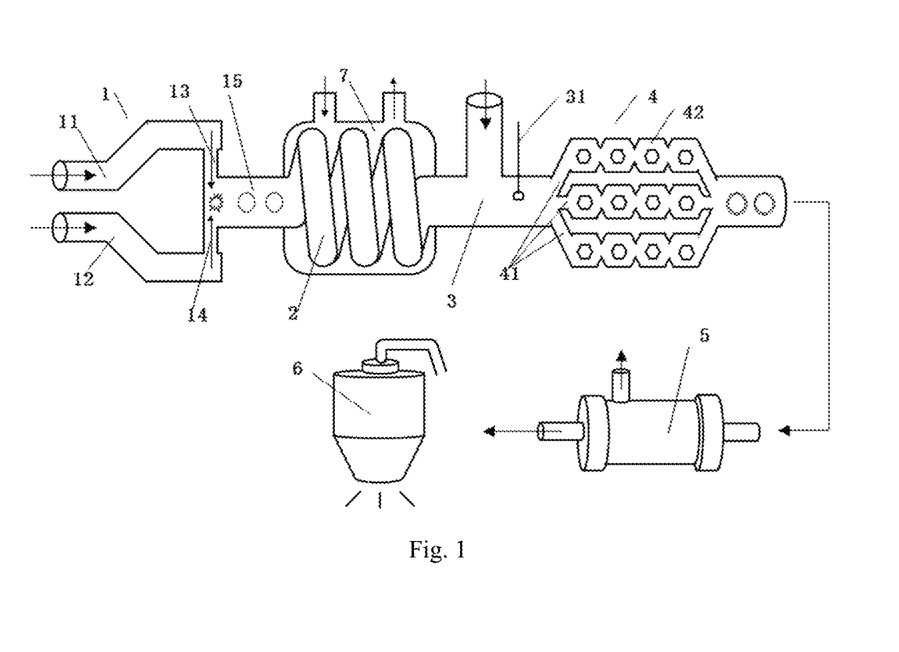
FIG. 1 structurally shows a microchannel device according to an embodiment of the present disclosure.

In the drawings, 1, high-pressure homogenization chamber; 11, aqueous phase feed pipe; 12, oil phase feed pipe; 13, first high-pressure acceleration pipe; 14, second high-pressure acceleration pipe; 15, mixing pipe; 2, deceleration-cooling channel; 3, acidity regulation channel; 31, pH detection probe; 4, microchannel reaction chamber; 41, reaction flow channel; 42, microchannel; 5, ultrafiltration desalination chamber; 6, spray dryer; and 7, cooling water circulating device.

DETAILED DESCRIPTION OF EMBODIMENTS

As shown in FIG. 1, this application provides a microchannel device, including a high-pressure homogenization chamber 1, a deceleration cooling channel 2, an acidity regulation channel 3, a microchannel reaction chamber 4, an ultrafiltration desalination chamber 5, and a spray dryer 6 that are connected in sequence.

The high-pressure homogenization chamber 1 includes an aqueous phase feed pipe 11, an oil phase feed pipe 12, a first high-pressure acceleration pipe 13, a second high-pressure acceleration pipe 14, and a mixing pipe 15. An inlet end of the first high-pressure acceleration pipe 13 is connected to the aqueous phase feed pipe 11, and an outlet end of the first high-pressure acceleration pipe 13 is connected to the mixing pipe 15. An inlet end of the second high-pressure acceleration pipe 14 is connected to the oil phase feed pipe 12, and an outlet end of the second high-pressure acceleration pipe 14 is connected to the mixing pipe 15. An inner diameter of the first high-pressure acceleration pipe 13 is smaller than that of the aqueous phase feed pipe 11, and an inner diameter of the second high-pressure acceleration pipe 14 is smaller than that of the oil phase feed pipe 12. Specifically, the first high-pressure acceleration pipe 13 is perpendicularly connected to a sidewall of an outlet end of the aqueous phase feed pipe 11 such that a T-shape structure is formed by the first high-pressure acceleration pipe 13 and the outlet end of the aqueous phase feed pipe 11. The second high-pressure acceleration pipe 14 is vertically connected to a sidewall of an outlet end of the oil phase feed pipe 12 such that a T-shape structure is formed by the second high-pressure acceleration pipe 14 and the outlet end of the oil phase feed pipe 12. As the inner diameter decrease from the feed pipe to the high-pressure acceleration pipe, a high pressure is formed. Besides, the first high-pressure acceleration pipe 13 and the second high-pressure acceleration pipe 14 are arranged perpendicularly on the sidewall of the aqueous phase feed pipe 11 and the sidewall of the oil phase feed pipe 12, respectively, instead of the end of the aqueous phase feed pipe 11 or the oil phase feed pipe 12. In this case, materials are dispersed better, and under the high pressure, the shearing force of the continuous phase liquid will shear off the dispersed phase thereby forming small droplets to form an emulsion. Then the oil and aqueous phases will form an emulsion with stable sizes after passing through the high-pressure homogenization chamber. The aqueous phase feed pipe 11 and the oil phase feed pipe 12 each include an inlet end, a middle section and an outlet end. Inlet ends and the outlet ends of the aqueous phase feed pipe 11 and the oil phase feed pipe 12 are all arranged along the direction parallel to the mixing pipe 15. Middle sections of the aqueous phase feed pipe 11 and the oil phase feed pipe 12 are both arranged in an outward-inclined manner, such that the aqueous phase feed pipe 11 and the oil phase feed pipe 12 are respectively located at two sides of the mixing pipe 15, and together form a Y-type structure. The first high-pressure acceleration pipe 13 and the second high-pressure acceleration pipe 14 are both arranged perpendicular to the mixing pipe 15. The arrangement of Y-shaped feed pipes and the arrangements of the first high-pressure acceleration pipe 13 and the second high-pressure acceleration pipe 14 perpendicular to the mixing pipe 15 facilitate the material dispersion and mixing to form an emulsion.

The microchannel reaction chamber 4 includes three reaction flow channels 41 parallel to each other. Each reaction flow channel 41 consists of four microchannels 42 connected in sequence. Specifically, each microchannel 42 consists of two pipes having a hexagonal cross-section, and the two pipes have different sizes, where the pipe with a smaller hexagonal cross-section is arranged inside the pipe with a larger hexagonal cross-section, such that the space between the inner pipe and the outer pipe is configured as a channel for flowing of the emulsion. Each reaction flow channel 41 consists of four microchannels 42 connected in sequence. The inner diameter of the microchannel 42 is small, and the emulsion may hit the pipes with hexagonal cross-sections when passing through the corners of the microchannels 42. In this case, the emulsion can be fully dispersed and thus can fully react in the reaction chamber, which is conducive to the occurrence of interfacial cohesion.

The deceleration cooling channel 2 is spiral-shaped, whose inlet end is connected to the mixing pipe 15 and outlet end is connected to the reaction flow channel 41. The deceleration cooling channel 2 also includes a cooling water circulating device 7. The cooling water circulating device 7 is provided with a water inlet and a water outlet. The deceleration cooling channel 2 is arranged in the cooling water circulating device 7. The emulsion passes through the deceleration cooling channel 2 such that the temperature and flow rate of the emulsion are reduced, and the heat is taken away by the circulating water outside the pipe.

The acidity regulation channel 3 includes a connection pipe and an acid feed pipe. The deceleration cooling channel 2 and the microchannel reaction chamber 4 are connected by the connection pipe. The acid feed pipe is arranged on the connection pipe, and a pH detection probe is arranged inside the connection pipe for detecting the pH of the emulsion after acidity regulation. By arranging the acidity regulation channel 3, dilute hydrochloric acid can be fed in control. The pH detection probe is configured to detect and feedback the pH of emulsion, and the emulsion is specifically adjusted from pH>10.5 to pH 6.5-7.5. At this point, the proteins, due to self-assembly, undergo interfacial coagulation at the surface of the emulsion to wrap the oil droplets, thus forming a firm core-shell structure.

The ultrafiltration desalination chamber 5 is connected to the outlet end of the microchannel reaction chamber 4 for removing $Na^+$ and $Cl^-$ from the reaction material. The ultrafiltration desalination chamber 5 includes a hollow fiber ultrafiltration inner chamber and an inlet, a first outlet and a second outlet, where the inlet, the first outlet and the second outlet are connected to the hollow fiber ultrafiltration inner chamber. The emulsion flows through the entire ultrafiltration pipes under pressure drive and filters $Na^+$ and $Cl^-$ ions outward through the fibers. After removal of $Na^+$ and $Cl^-$ ions, the emulsion flows out from the first outlet, and the waste liquid containing $Na^+$ and $Cl^-$ ions is discharged from the second outlet.

The spray dryer 6 is connected to the ultrafiltration desalination chamber 5 and is configured for drying the reaction material. The spray dryer includes a primary tower and a secondary tower. The deionized emulsion undergoes spray drying to form stable, highly oil-loaded microcapsules.

Figure 2:
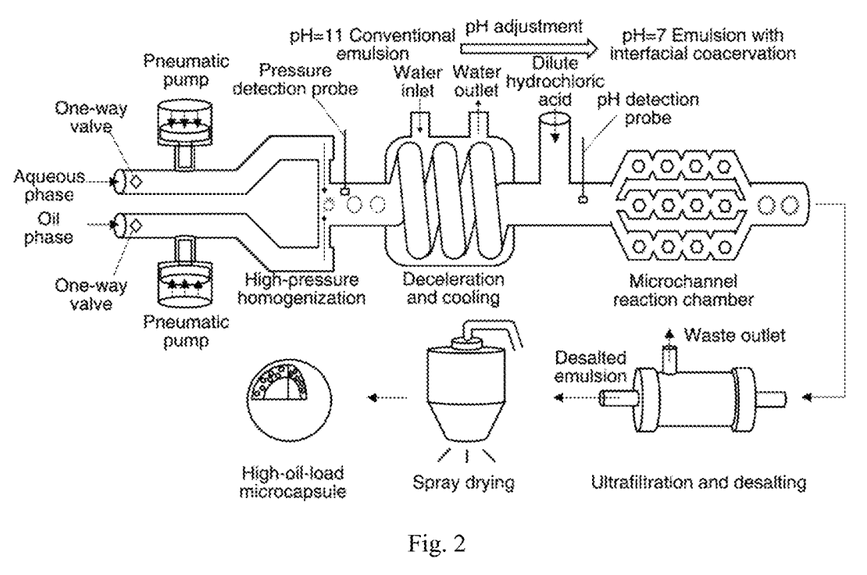
FIG. 2 is a flow chart illustrating a method for preparing a high-oil-load microcapsule according to an embodiment of the present disclosure.
Figure 3A:
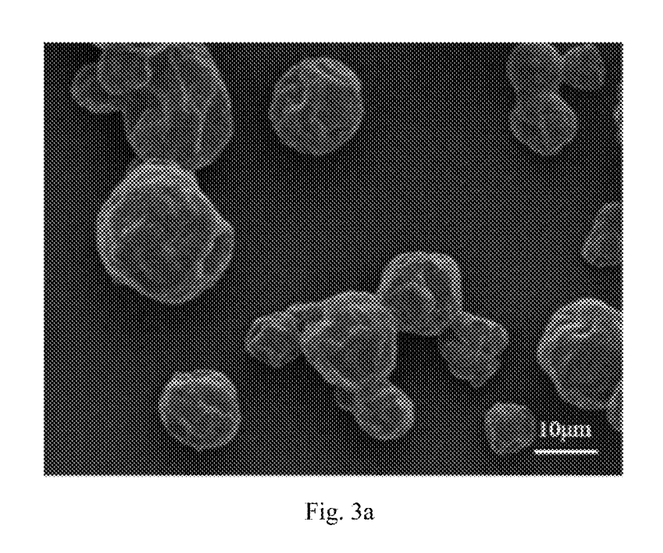
FIGS. 3a-3e are scanning electron microscope (SEM) images of microcapsules prepared in Examples 1-4 and Comparative Example 2 of the present disclosure, respectively.
Figure 3B:
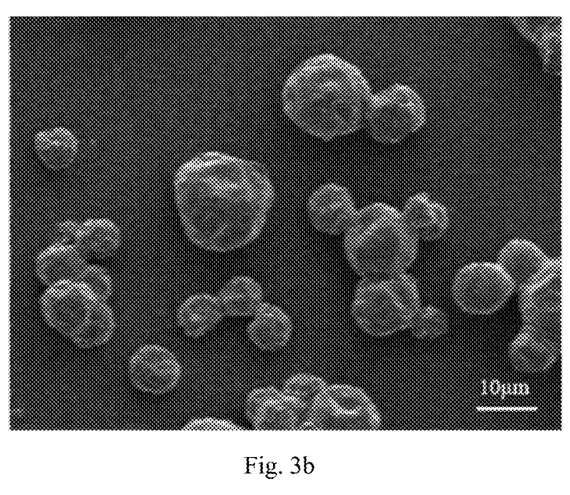
Figure 3C:
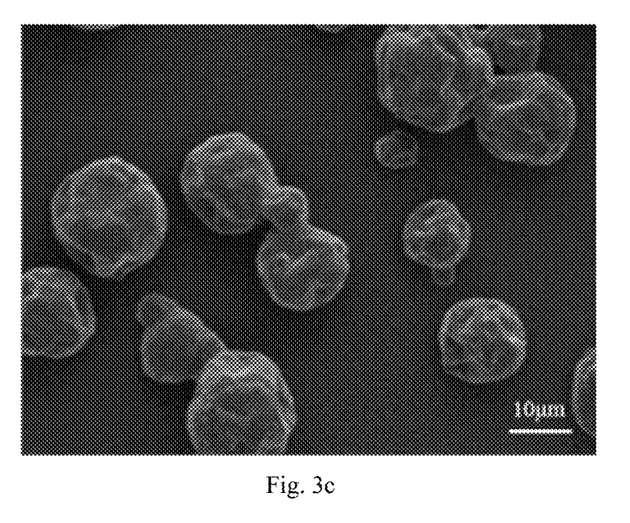
Figure 3D:
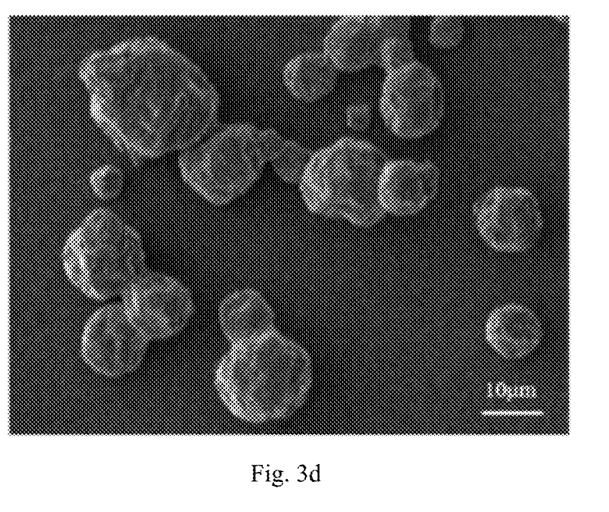
Figure 3E:
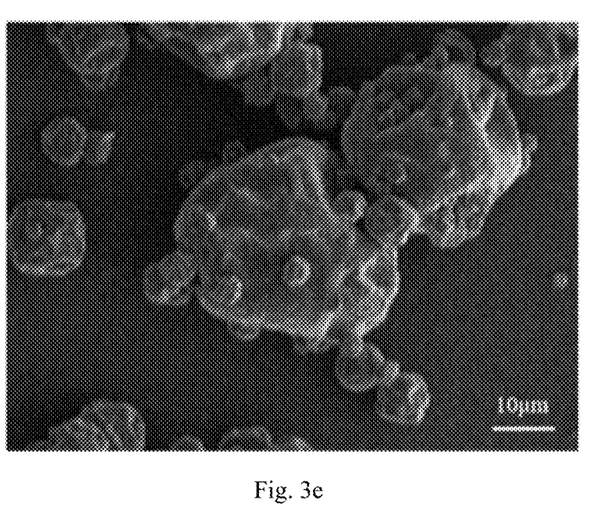

As shown in FIG. 2, each of the first high-pressure acceleration pipe 13 and the second high-pressure acceleration pipe 14 is connected with a pneumatic pump. An inlet end of each of the aqueous phase feed pipe 11 and the oil phase feed pipe 12 is provided with a one-way valve. A pressure detection probe is provided at an outlet end of the high-pressure homogenization chamber 1. A pressure in each of the first high-pressure acceleration pipe 13 and the second high-pressure acceleration pipe 14 is set to 30-150 MPa.

The microchannel device in this embodiment can be used for preparing microcapsules in an efficient, stable, and sustainable way. An aqueous-phase liquid and an oil-phase liquid formulated in advance are directly fed into two pipes of the microchannel device. The two immiscible liquids can form a single emulsion with uniform dispersion and micro size through a pressurized pipe. Then the emulsion flows rapidly in the microchannels and undergoes dispersion, homogenization, and emulsification, shortening the time for preparing oil-in-water emulsions compared with the traditional process. Moreover, the emulsion prepared by using the microchannel device has a high-quality single microdroplet, which provides a technical basis for the preparation of high-quality high-oil-load microcapsules from emulsions.

The present disclosure will be further described in detail with reference to the following examples, but the present disclosure is not limited thereto.

Example 1

Provided herein was a method of preparing high-oil-load microcapsules by using the aforementioned microchannel device, which included the following steps.

(S1) Gluten powder was dissolved in an aqueous solution of pH 11 to obtain a solution with a gliadin concentration of 10% (w/v), which was centrifuged at 5,000 rpm for 10 min. The precipitate was discarded, and the resultant supernatant was added with maltodextrin and α-cyclodextrin, and continuously stirred with a stirrer for 30 min to obtain an aqueous phase mixture (containing protein and polysaccharide) for preparing an emulsion of the microcapsules, where a weight ratio of the gliadin to the maltodextrin was 5:1, and a weight ratio of the gliadin to the α-cyclodextrin was 5:1.

(S2) Linseed oil was selected as an oil phase, where a weight ratio of the oil phase (core material) to the aqueous phase mixture (wall material) was 4:1 (i.e., an oil load rate of 80%).

(S3) A 2 mol/L dilute hydrochloric acid solution was prepared for use.

(S4) The aqueous phase mixture and the oil phase were separately fed into the aforementioned microchannel device to prepare an oil-in-water emulsion with a certain size. The dilute hydrochloric acid was continuously fed into the acidity regulation channel until the emulsion was adjusted to pH 7 such that the interfacial coacervation occurred at the emulsion surface to trigger the formation of a firm core-shell structure.

(S5) The emulsion with the core-shell structure was desalted in the ultrafiltration-desalination chamber to remove $Na^+$ and $Cl^-$ ions.

(S6) The emulsion was fed into the spray dryer for spray drying, during which the inlet air temperature was kept at 175° C., and the emulsion was stirred continuously to obtain the high-oil-load microcapsule powder.

Example 2

Provided herein was a method of preparing high-oil-load microcapsules by using the aforementioned microchannel device, which included the following steps.

(S1) Corn gluten meal was dissolved in an aqueous solution of pH 11 to obtain a solution with a zein concentration of 5% (w/v), which was centrifuged at 5,000 rpm for 10 min. The precipitate was discarded, and the resultant supernatant was added with carrageenan and octenyl succinic anhydride-modified (OSA)-modified-starch, and continuously stirred with a stirrer for 30 min to obtain an aqueous phase mixture (containing protein and polysaccharide) for preparing an emulsion of the microcapsules, where a weight ratio of the zein to the carrageenan was 10:1, and a weight ratio of the zein to the OSA-starch was 5:1.

(S2) Camellia oil was selected as an oil phase, where a weight ratio of the oil phase (core material) to the aqueous phase mixture (wall material) was 4:1 (i.e., an oil load rate of 80%).

(S3) A 2 mol/L dilute hydrochloric acid solution was prepared for use.

(S4) The aqueous phase mixture and the oil phase were separately fed into the aforementioned microchannel device to prepare an oil-in-water emulsion with a certain size. The dilute hydrochloric acid was continuously fed into the acidity regulation channel until the emulsion was adjusted to pH 7 such that the interfacial coacervation occurred at the emulsion surface to trigger the formation of a firm core-shell structure.

(S5) The emulsion with the core-shell structure was desalted in the ultrafiltration-desalination chamber to remove $Na^+$ and $Cl^-$ ions.

(S6) The emulsion was fed into the spray dryer for spray drying, during which the inlet air temperature was kept at 175° C., and the emulsion was stirred continuously to obtain the high-oil-load microcapsule powder.

Example 3

Provided herein was a method of preparing high-oil-load microcapsules by using the aforementioned microchannel device, which included the following steps.

(S1) Sorghum flour that was defatted and decolored was dissolved in an aqueous solution of pH 11 to obtain a solution with a kafirin concentration of 5% (w/v), which was centrifuged at 5,000 rpm for 15 min. The precipitate was discarded, and the resultant supernatant was added with arabic gum and OSA-starch, and continuously stirred with a stirrer for 30 min to obtain an aqueous phase mixture (containing protein and polysaccharide) for preparing an emulsion of the microcapsules, where a weight ratio of the kafirin to the arabic gum was 10:1, and a weight ratio of the kafirin to the OSA-starch was 5:1.

(S2) Peony seed oil was selected as an oil phase, where a weight ratio of the oil phase (core material) to the aqueous phase mixture (wall material) was 4:1 (i.e., an oil load rate of 80%).

(S3) A 2 mol/L dilute hydrochloric acid solution was prepared for use.

(S4) The aqueous phase and the oil phase were separately fed into the aforementioned microchannel device to prepare an oil-in-water emulsion with a certain size. The dilute hydrochloric acid was continuously fed into the acidity regulation channel until the pH of the emulsion was adjusted to 7 such that the emulsion underwent interfacial polymerization on the surface thereof to form a firm core-shell structure.

(S5) The emulsion with the core-shell structure was desalted in the ultrafiltration chamber to remove $Na^+$ and $Cl^-$ ions.

(S6) The emulsion was fed into the spray dryer with an inlet air temperature of 175° C. for spray drying, during which the emulsion was stirred continuously to obtain the microcapsules with a high oil load.

Example 4

Provided herein was a method of preparing high-oil-load microcapsules by using the aforementioned microchannel device, which included the following steps.

(S1) Gluten powder and corn gluten meal were dissolved in an aqueous solution of pH 11 to obtain a solution with a gliadin concentration of 5% and a zein concentration of 5%, which was centrifuged at 5,000 rpm for 10 min. The precipitate was discarded, and the resultant supernatant was added with guar gum, and continuously stirred with a stirrer for 30 min to obtain an aqueous phase mixture (containing protein and polysaccharide), where a weight ratio of the total protein to the guar gum was 12:1.

(S2) Grape seed oil was selected as an oil phase, where the weight ratio of the oil phase (core material) to the aqueous phase mixture (wall material) was 4:1 (i.e., an oil load rate of 80%).

(S3) A 2 mol/L dilute hydrochloric acid solution was prepared for use.

(S4) The aqueous phase mixture and the oil phase were separately fed into the aforementioned microchannel device to prepare an oil-in-water emulsion with a certain size. The dilute hydrochloric acid was continuously fed into the acidity regulation channel until the emulsion was adjusted to pH 7 such that the interfacial coacervation occurred at the emulsion surface to trigger the formation of a firm core-shell structure.

(S5) The emulsion with the core-shell structure was desalted in the ultrafiltration-desalination chamber to remove $Na^+$ and $Cl^-$ ions.

(S6) The emulsion was fed into the spray dryer for spray drying, during which the inlet air temperature was kept at 175° C., and the emulsion was stirred continuously to obtain the high-oil-load microcapsule powder.

Comparative Example 1

Provided herein was a method of preparing microcapsules, which included the following steps.

(S1) Gluten powder was dissolved in distilled water and centrifuged at 5,000 rpm for 10 min.

It was found that the gluten powder was almost insoluble in water, and mainly existed as precipitates after centrifugation. Hence, it was impossible to perform the subsequent processes.

Comparative Example 2

Provided herein was a method of preparing microcapsules by using a dispersion device, which included the following steps.

(S1) Gluten powder was dissolved in an aqueous solution of pH 11 to obtain a solution with a gliadin concentration of 10% (w/v), which was centrifuged at 5,000 rpm for 10 min. The precipitate was discarded, and the resultant supernatant was added with carrageenan and α-cyclodextrin, and continuously stirred with a stirrer for 30 min to obtain an aqueous phase mixture (containing protein and polysaccharide), where a weight ratio of the gliadin to the carrageenan was 10:1, and a weight ratio of the gliadin to the α-cyclodextrin was 5:1.

(S2) Grape seed oil was selected as an oil phase, where a weight ratio of the oil phase (core material) to the aqueous phase mixture (wall material) was 4:1 (i.e., an oil load rate of 80%).

(S3) A 2 mol/L dilute hydrochloric acid solution was prepared for use.

(S4) The aqueous phase mixture and the oil phase were fed into the dispersion device at 12,000 rpm for 2 min to prepare an emulsion.

(S5) The 2 mol/L dilute hydrochloric acid was dropwise fed into the emulsion until the emulsion was adjusted to pH 7, during which the emulsion was stirred with a stirrer.

(S6) The emulsion was fed into the spray dryer for spray drying, during which the inlet air temperature was kept at 175° C., and the emulsion was stirred continuously to obtain the high-oil-load microcapsule powder.

Experimental Results

The microcapsules prepared in Examples 1-4 and Comparative Example 2 were observed under scanning electron microscopy and were tested regarding their oil loads and encapsulation rates as follows.

(1) Determination of Encapsulation Rate

The encapsulation rate (%) of the microcapsule was calculated by [(total oil content−surface oil content)/total oil content]×100%.

The surface oil content of the microcapsule was determined through the following steps.

To a triangular flask with a constant weight of $m_1$ were added 2 g of a sample (accurate to 0.001 g) and 15 mL of petroleum ether for extraction for 10 min, during which the triangular flask was shaken at intervals. After that, the sample was filtered with filter paper. After extraction 3 times, the triangular flask and the filter paper were rinsed with 10 mL of petroleum ether. The filtrates were gathered in a dried and weighed evaporation flask and subjected to vacuum spin dry at 30° C. Then the evaporation flask was cooled and weighed as $m_2$.

(2) Determination of Oil Load

The surface oil content (%) was calculated by $(m_2-m_1)/m\times100\%$, where m was the weight of the sample.

The total oil content of the microcapsule was determined through the following steps.

1 g of microcapsule powder was weighed and dispersed in 25 ml of a mixture, and stirred at 800 rpm for 15 min, followed by centrifugation at 8000 rpm for 2 min, where the mixture consisted of hexane and isopropanol in a volume ratio of 3:1. After that, the clear upper phase was collected and the lower aqueous phase was re-extracted with an equal amount of solvent. The two organic phases were gathered and were subjected to rotary evaporation drying at 105° C. for 2 h to remove excess solvent.

The SEM images of the microcapsules prepared in Examples 1-4 and Comparative Example 2 were shown in FIG. 3a-3e. The microcapsules prepared in Examples 1-4 had a more uniform particle size and less inter-particle adhesion. Compared with the microcapsules prepared in Examples 1-4, the microcapsules obtained in Comparative Example 2 had a larger and less uniform particle size and more inter-particle adhesion. This showed that the microchannel device of the present disclosure could facilitate the formation of uniformly dispersed and micro-sized single emulsion/microcapsules.

Figure 4:
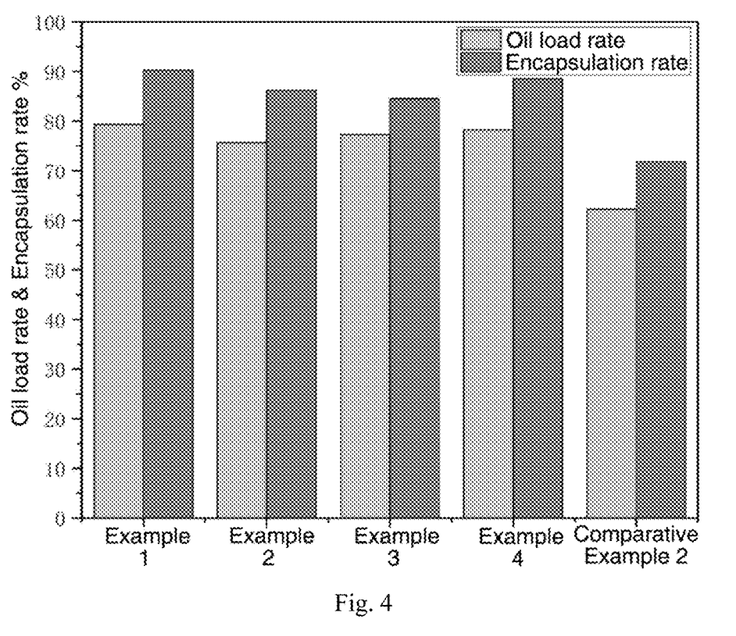
FIG. 4 schematically shows comparison among the microcapsules prepared in Examples 1-4 and Comparative Example 2 of the present disclosure in terms of oil load rate and encapsulation rate.

The test results of the oil loads and the encapsulation rates were shown in FIG. 4. The microcapsules prepared in Examples 1-4 were comparable regarding their oil loads and encapsulation rates, where the highest oil load was 80%, and the highest encapsulation rate was 90%. Compared with the microcapsules prepared in Comparative Examples 2, the oil loads and encapsulation rates of the microcapsules prepared in Examples 1-4 were significantly superior. It showed that the microchannel device of the present disclosure was conducive to forming a single emulsion with uniform dispersion and micro sizes from two immiscible liquids. Moreover, the produced emulsion had a high quality of the single microdroplet, thus improving the oil load and encapsulation rate of microcapsules.

Described above are merely preferred embodiments of the present disclosure, which are not intended to limit the disclosure. Any equivalent substitutions, changes and modifications made by those skilled in the art without departing from the spirit of the disclosure shall fall within the scope of the present disclosure defined by the appended claims.

What is claimed is:

1. A method of preparing an oil-loading microcapsule using a microchannel device, the microchannel device comprising:
   a homogenization chamber; and
   a microchannel reaction chamber;
   wherein the homogenization chamber comprises an aqueous phase feed pipe, an oil phase feed pipe, a first high-pressure acceleration pipe, a second high-pressure acceleration pipe, and a mixing pipe; an inlet end of the first high-pressure acceleration pipe is connected to the aqueous phase feed pipe, and an outlet end of the first high-pressure acceleration pipe is connected to the mixing pipe; an inlet end of the second high-pressure acceleration pipe is connected to the oil phase feed pipe, and an outlet end of the second high-pressure acceleration pipe is connected to the mixing pipe; an inner diameter of the first high-pressure acceleration pipe is smaller than that of the aqueous phase feed pipe, and an inner diameter of the second high-pressure acceleration pipe is smaller than that of the oil phase feed pipe;
   the microchannel reaction chamber comprises at least one reaction flow channel; the at least one reaction flow channel each comprises at least two microchannels communicated in sequence; each of the at least two microchannels comprises an inner tube and an outer tube; and a space between the inner tube and the outer tube is configured for fluid flowing; and
   the method comprises:
   (S1) mixing an alcohol-soluble protein and a hydrocolloid followed by dispersion, alkalinity regulation, and centrifugal filtration to obtain an aqueous phase mixture; and preparing an oil phase;
   (S2) feeding the aqueous phase mixture into the homogenization chamber through the aqueous phase feed pipe, and feeding the oil phase into the homogenization chamber through the oil phase feed pipe; dispersing the aqueous phase mixture through the first high-pressure acceleration pipe, and dispersing the oil phase through the second high-pressure acceleration pipe and mixing the aqueous phase mixture and the oil phase in the mixing pipe to form a first emulsion;
   (S3) cooling the first emulsion;
   (S4) adjusting the first emulsion to pH 6.5-7.5 with dilute hydrochloric acid; allowing the first emulsion to flow into the microchannel reaction chamber to undergo dispersion and mixing such that the alcohol-soluble protein in the aqueous phase mixture undergoes interfacial coacervation to embed the oil phase, thereby obtaining a second emulsion with a core-shell structure;

(S5) removing $Na^+$ and $Cl^-$ from the second emulsion; and (S6) drying the second emulsion to obtain the oil-loading microcapsule in a powder form.

2. The method of claim 1, wherein in step (S1), the alcohol-soluble protein is selected from the group consisting of gliadin, zein, kafirin, and a combination thereof;

the hydrocolloid is selected from the group consisting of gum arabic, carrageenan, guar gum, maltodextrin, alpha-cyclodextrin, beta-cyclodextrin, octenyl succinic anhydride-modified (OSA)-modified starch, and a combination thereof;

the oil phase is selected from the group consisting of *camellia* oil, linseed oil, peony seed oil, grape seed oil, and a combination thereof;

the alkalinity regulation is performed to adjust a mixture of the alcohol-soluble protein and the hydrocolloid to pH 10.5-12; and the centrifugal filtration is performed at 3000-6000 rpm for 5-20 min.

3. The method of claim 1, wherein in step (S3), the first emulsion is cooled through steps of:

feeding the first emulsion to a deceleration-cooling channel, and feeding cooling water into a cooling water circulating device, wherein the deceleration-cooling channel is configured as spiral-shaped to cool the first emulsion and reduce a flow rate of the first emulsion;

in step (S4), the dilute hydrochloric acid is continuously fed through an acidity regulation channel, and a pH of the first emulsion is monitored and fed back through a pH detection probe;

in step (S5), the $Na^+$ and $Cl^-$ are removed from the second emulsion through steps of:

feeding the second emulsion to an ultrafiltration desalination chamber equipped with a hollow fiber ultrafiltration inner chamber such that the second emulsion passes through the hollow fiber ultrafiltration inner chamber to remove the $Na^+$ and $Cl^-$; and in step (S6), the drying is performed in a spray dryer.

4. The method of claim 1, wherein an inner diameter of each of the at least two microchannels is 0.4-1 mm;

in step (S4), the dilute hydrochloric acid has a concentration of 2 mol/L; and in step (S6), a particle size of the oil-loading microcapsule is 4-40 μm.

* * * * *